March 26, 1946.   R. J. JAUCH ET AL   2,397,267
HOSE REEL FOR LIQUID DISPENSING APPARATUS
Filed April 22, 1942   9 Sheets-Sheet 5
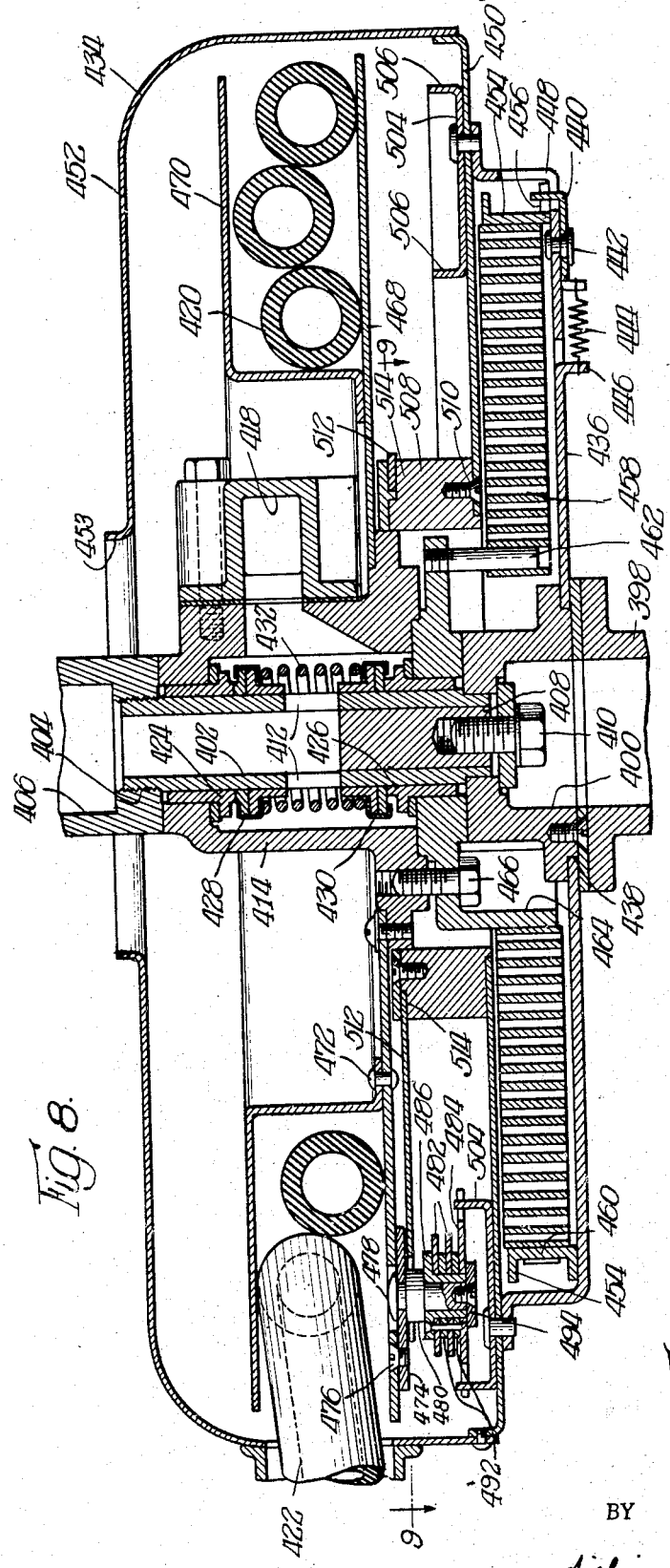
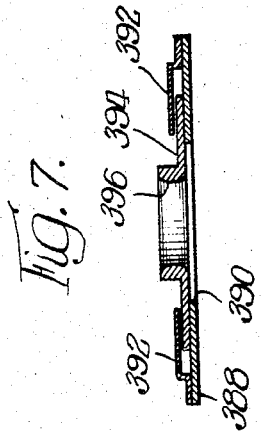
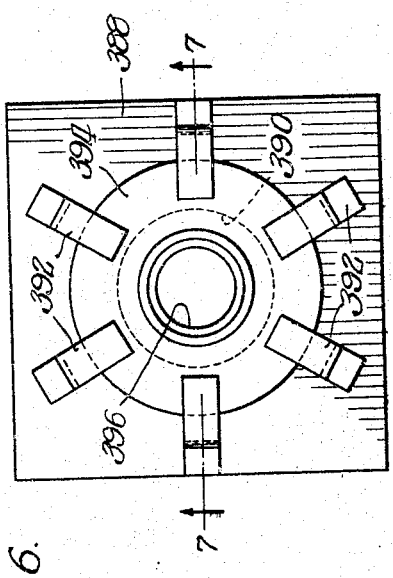
INVENTORS.
Robert J. Jauch,
Sherwood Hinds,
Frederick W. Sturm.
BY

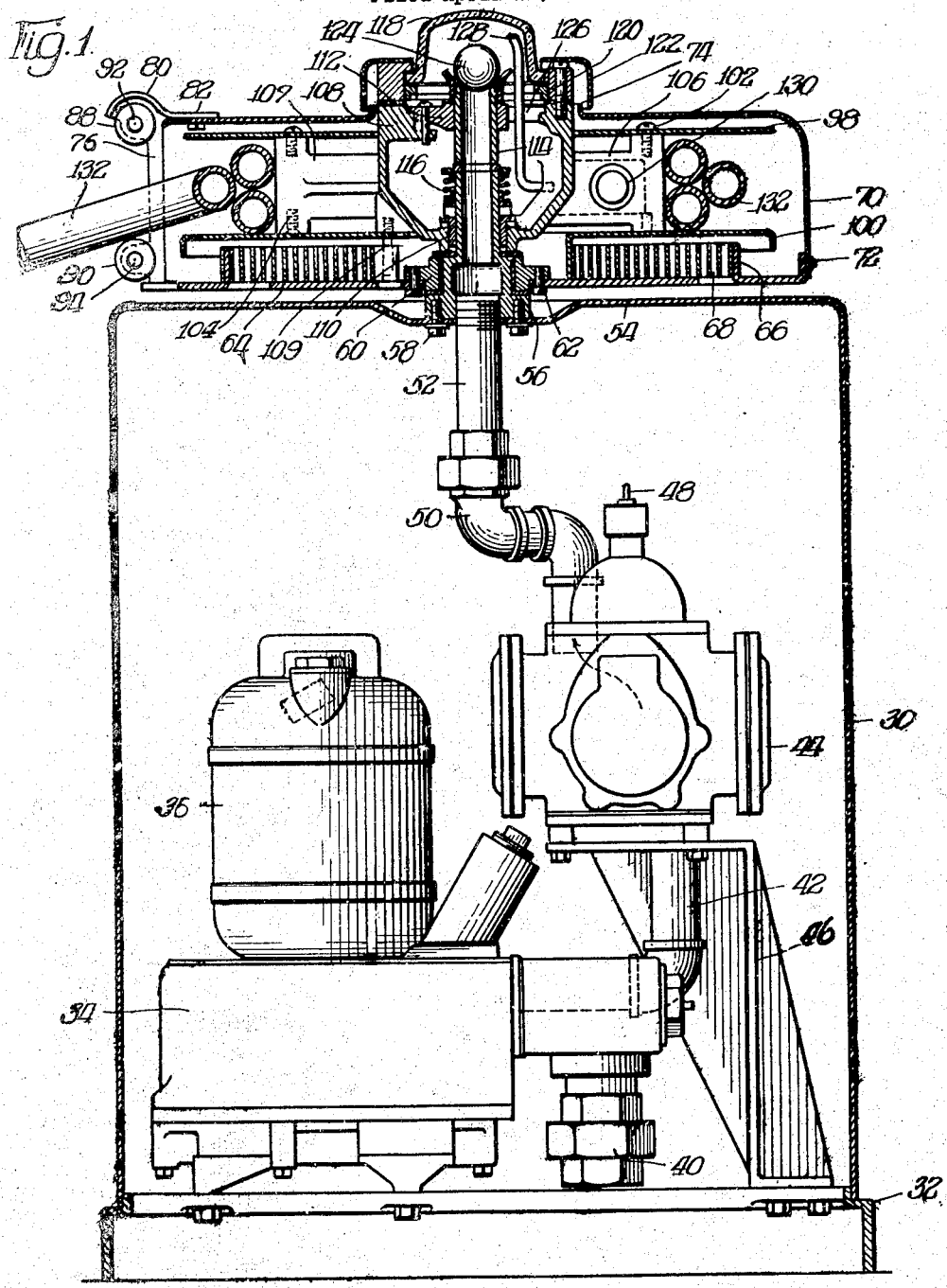

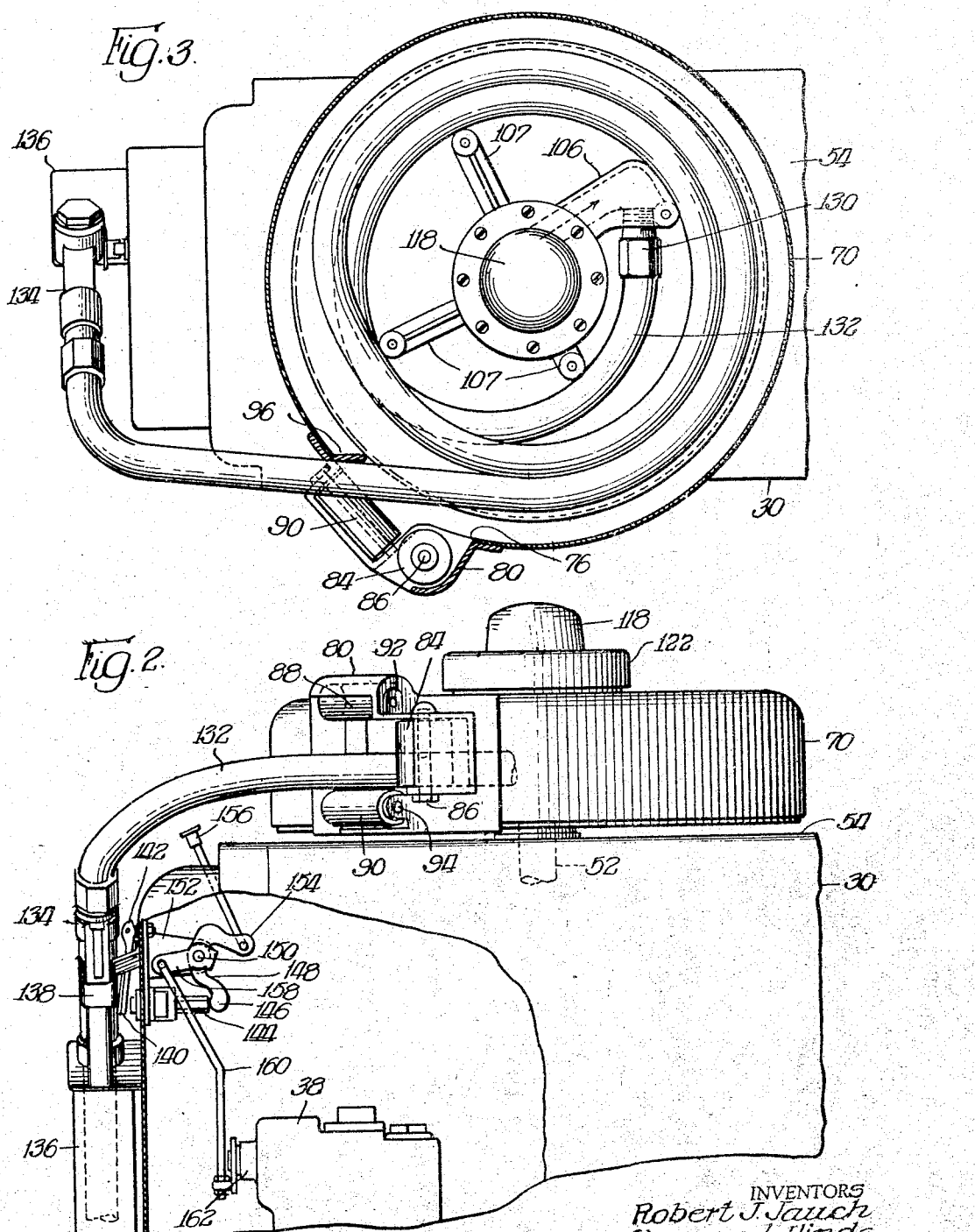

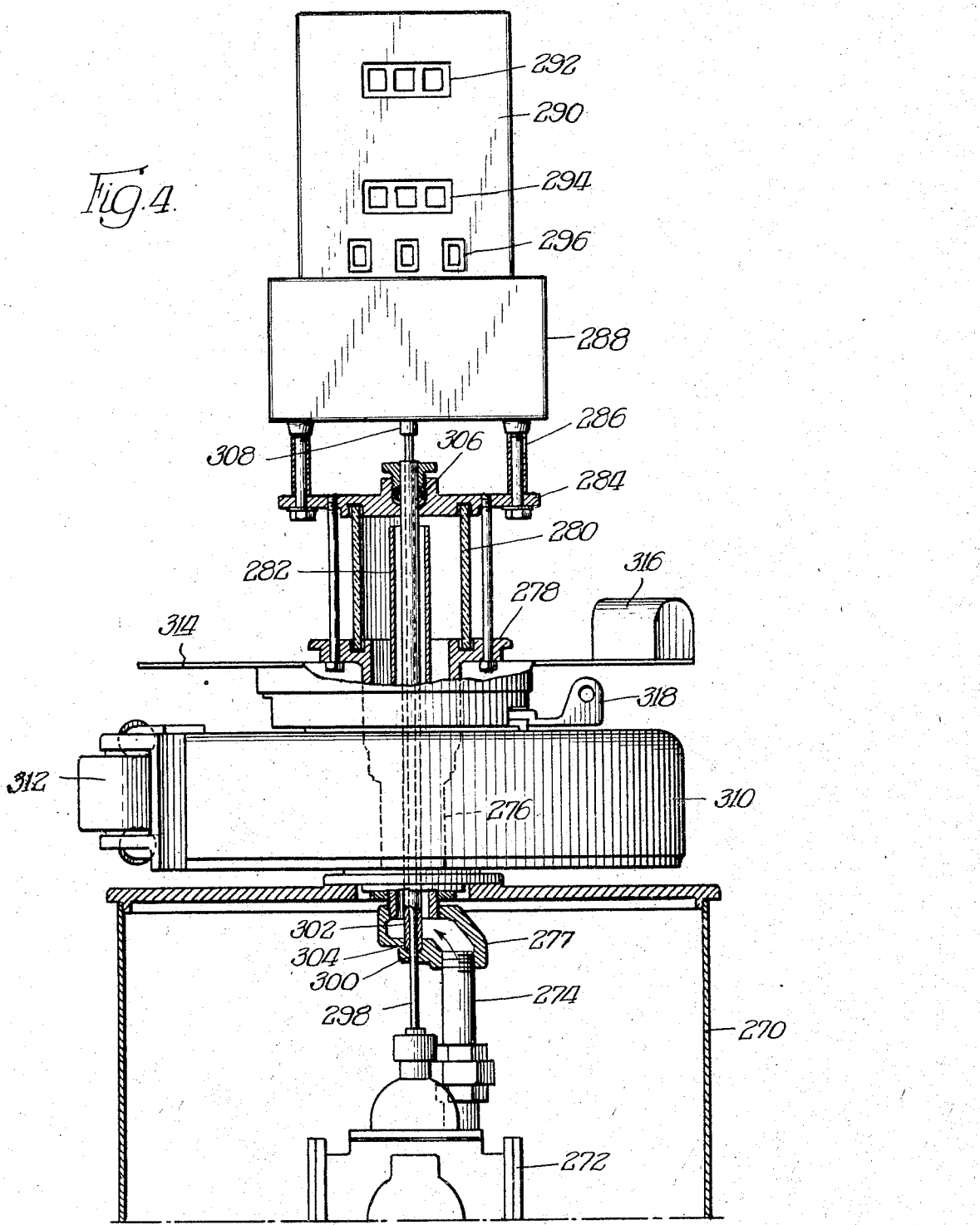

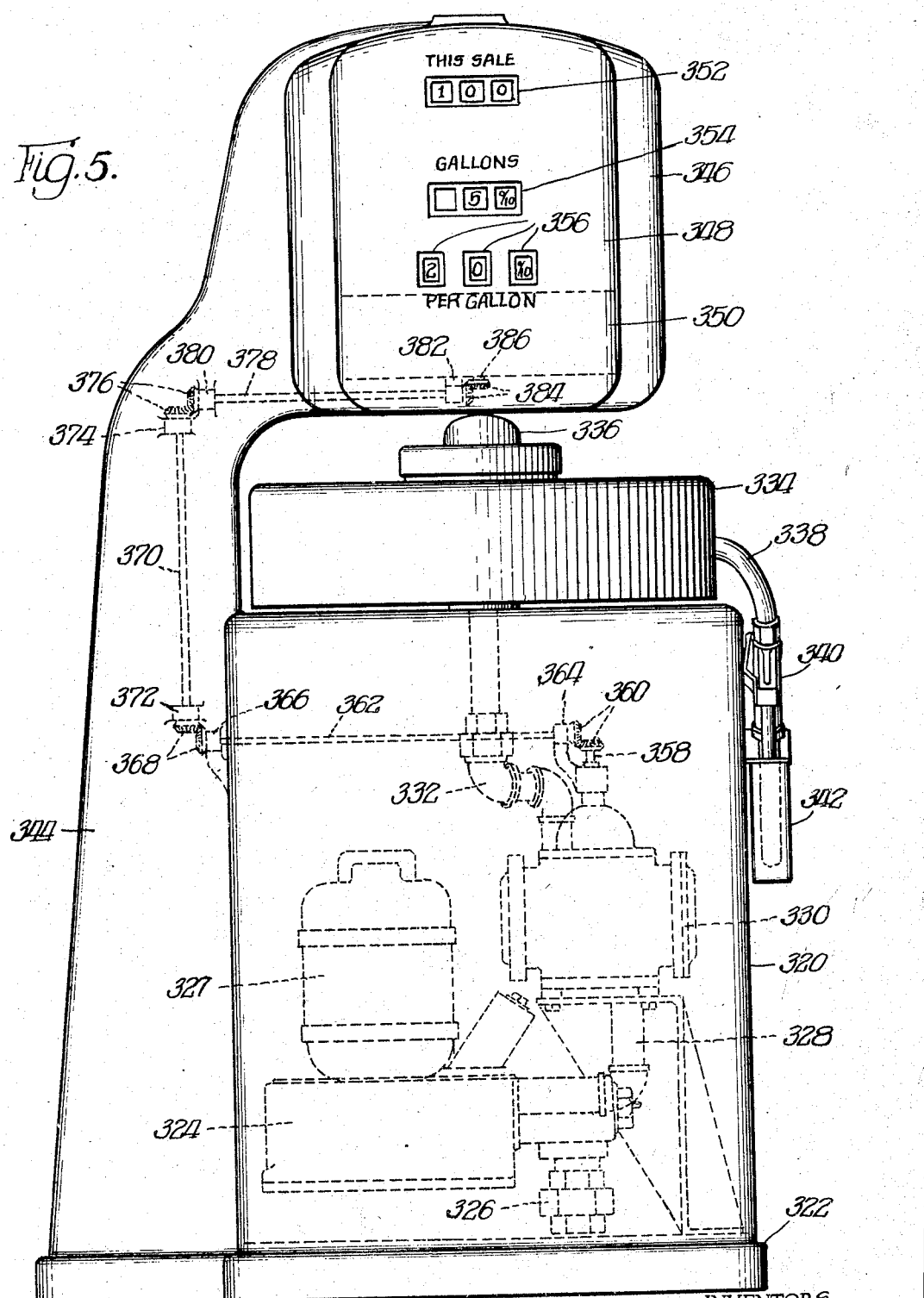

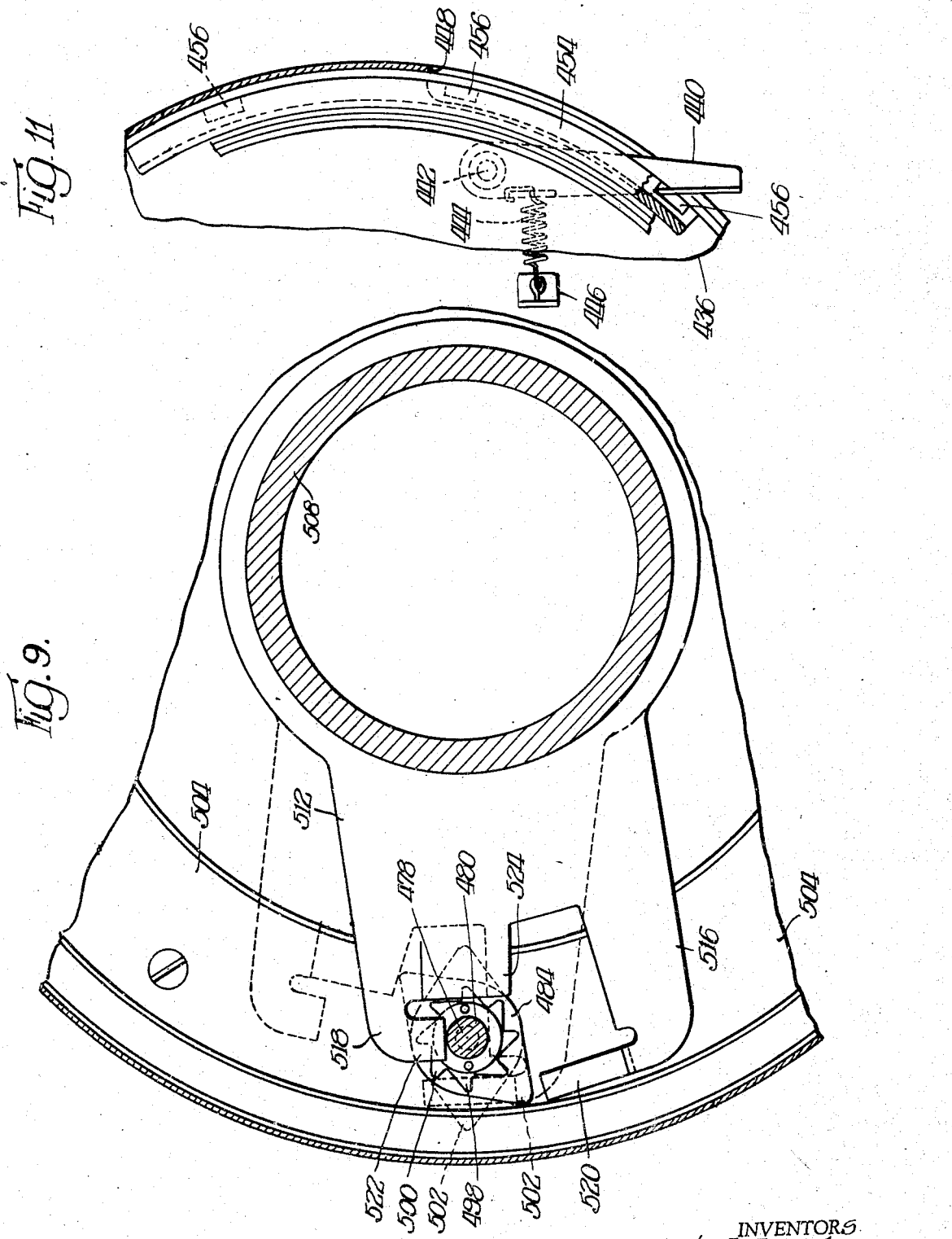

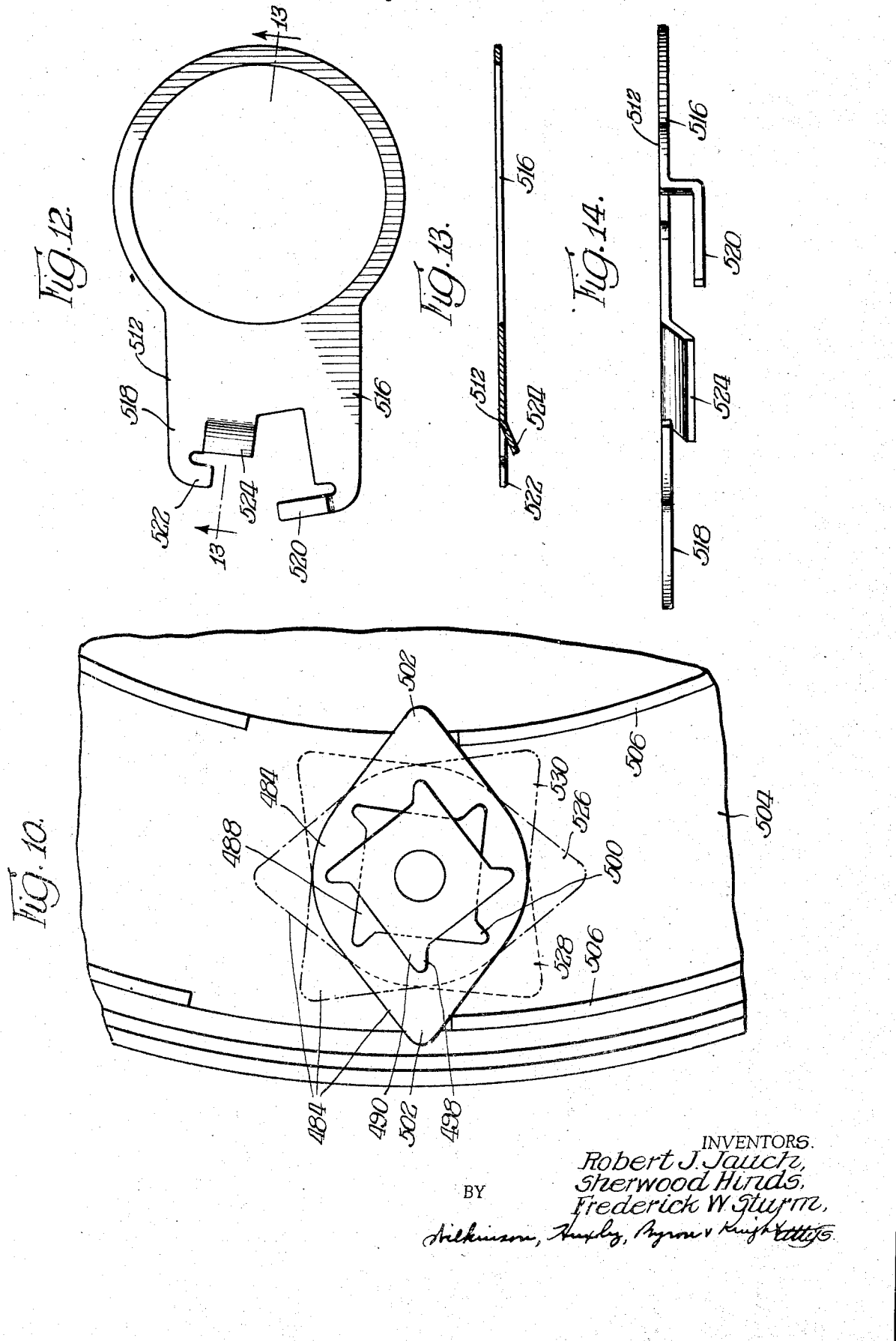

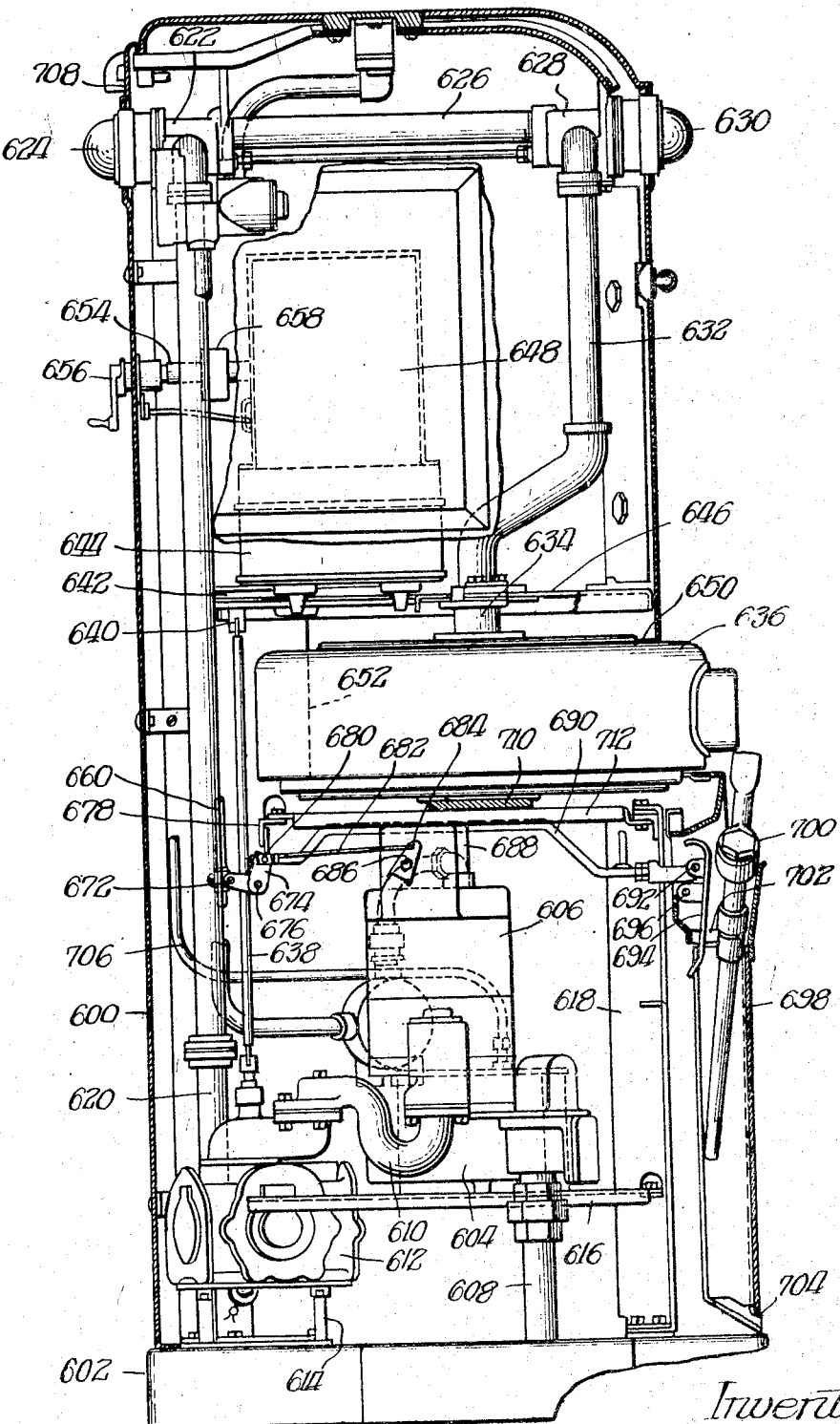

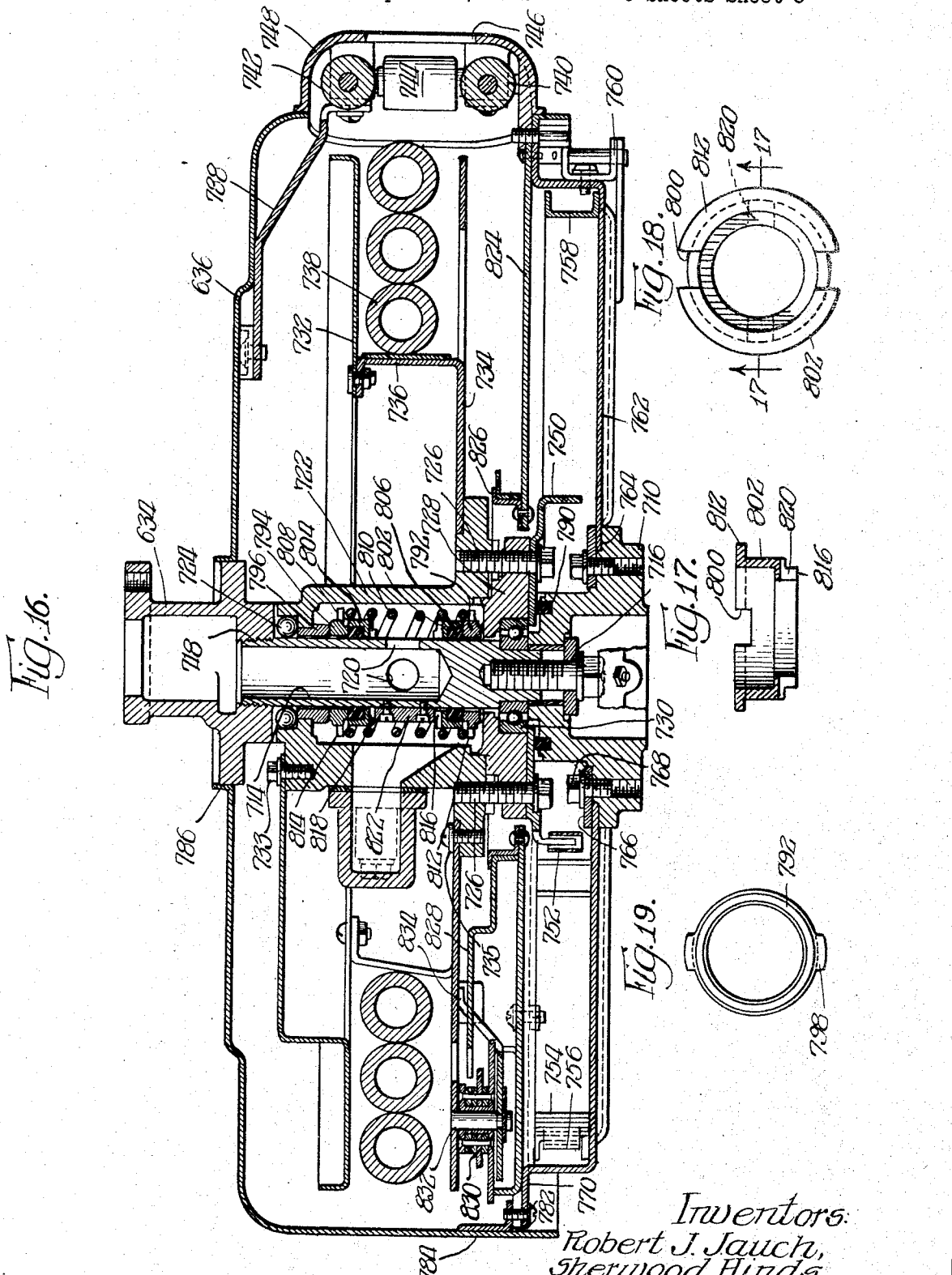

Patented Mar. 26, 1946

2,397,267

UNITED STATES PATENT OFFICE 2,397,267

HOSE REEL FOR LIQUID DISPENSING APPARATUS

Robert J. Jauch, Fort Wayne, Sherwood Hinds, Columbia City, and Frederick W. Sturm, Fort Wayne, Ind., assignors to The Wayne Pump Company, Fort Wayne, Ind., a corporation of Maryland Application April 22, 1942, Serial No. 440,080

8 Claims. (Cl. 222—23)

This invention pertains to hose reel liquid dispensing apparatus.

It is an object of this invention to provide a hose reel for a liquid dispensing apparatus so constructed and arranged that it is capable of operating through at least 360°.

Another object of this invention is to provide a hose reel wherein retrieving means is provided which may be adjusted.

Still another object of this invention is to provide a hose reel which is provided with automatic latching means affected by movement of the reel to controllably render the retrieving means thereof operative or inoperative.

Yet another object of the invention is to provide automatic latching means controllable by relative movements between two members.

A further object of the invention is to provide a hose reel construction for a liquid dispensing apparatus permitting ready connection between the registering and operating means therefor.

A yet further object of the invention is to provide a hose reel for liquid dispensing apparatus having mechanical connections between the meter and register wherein said connections extend through the hose reel assembly.

Still a further object of the invention is to provide a hose reel type of liquid dispensing apparatus wherein the hose may be supported on means interlocking with control means for said apparatus so as to prevent dispensing except under predetermined conditions.

A different object of the invention is to provide a hose reel type of liquid dispensing apparatus wherein the control switch may be conditioned to render the liquid dispensing apparatus inoperative and lock the nozzle in supported position.

A still different object of the invention is to provide a hose reel type of liquid dispensing apparatus wherein means is provided for cleaning the hose and preventing ingress of foreign matter into the reel.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is an elevation, partly in section, of a liquid dispensing apparatus provided with a hose reel embodying the invention;

Figure 2 is a fragmentary sectional elevation of the liquid dispensing apparatus such as shown in Figure 1, showing the hose nozzle in inoperative position;

Figure 3 is a fragmentary top plan view, partly in section, of the horizontal hose reel, the section being taken through the outlet port of the reel;

Figure 4 is a fragmentary sectional elevation of a modified form of hose reel liquid dispensing apparatus using a horizontal hose reel adapted to be rotated through substantially 360° or multiples thereof;

Figure 5 is an elevation showing another modified form of liquid dispensing apparatus using a horizontal type hose reel wherein the hose reel is capable of use through substantially 320°;

Figure 6 is an elevation of a guard for the hose outlet of a hose reel, the guard permitting ready unrestricted movements of said hose;

Figure 7 is a sectional elevation taken substantially in the plane as indicated by the line 7—7 of Figure 6;

Figure 8 is a sectional elevation through another modified form of horizontal hose heel;

Figure 9 is a fragmentary top plan view taken substantially in the plane as indicated by the line 9—9 of Figure 8, showing the latch and latch control mechanism therefor for the hose;

Figure 10 is an enlarged fragmentary top plan view through a portion of the hose reel illustrated in Figure 8, showing the latch mechanism in different positions of operation;

Figure 11 is an enlarged fragmentary sectional plan of the switch tension device of the hose reel illustrated in Figure 8;

Figure 12 is a top plan view of the latch control mechanism;

Figure 13 is a sectional elevation taken substantially in the plane as indicated by the line 13—13 of Figure 12;

Figure 14 is an end elevation of the latch mechanism illustrated in Figure 12, the same looking toward the right as viewed in said figure;

Figure 15 is a sectional elevation showing a modified form of liquid dispensing apparatus using a horizontal type hose reel embodying the invention wherein the hose reel is capable of rotation through substantially 320°;

Figure 16 is an enlarged sectional elevation of the hose reel used in the liquid dispensing apparatus shown in Figure 15;

Figure 17 is an enlarged sectional elevation of the seal retainer cup provided in the reel shown in Figure 16, the same being taken substantially in the plane as indicated by line 17—17 of Figure 18;

Figure 18 is a plan view of the cup shown in Figure 17 looking downwardly of Figure 17;

Figure 19 is a plan view of the seal ring provided in the reel shown in Figure 16.

This application is a continuation-in-part of application Serial No. 366,116, filed November 18, 1940.

Referring first of all more particularly to the liquid dispensing apparatus illustrated in Figures 1, 2 and 3, said apparatus consists essentially of the casing 30 supported on the pedestal 32. Within the casing the pump 34 is provided, said pump, as shown, being of the centrifugal type such as shown in Patent No. 2,124,681, granted July 26, 1938, to Robert J. Jauch et al. The pump is driven by the motor 36 controlled by the switch mechanism 38 and the inlet side of the pump is connected through the inlet connection 40 to a source of liquid supply (not shown). The outlet side of the pump is connected through the fitting 42 to the inlet side of the meter 44, said meter preferably being of the positive displacement type, and being conveniently supported on the pedestal 32 through the bracket 46. The meter is provided with the meter shaft 48 adapted to control the register (not shown), which register may be controlled by the meter. This control of the register by the meter shaft is fully shown and described in application Serial No. 409,570, to Kenly C. Bugg, for Liquid dispensing apparatus, filed September 4, 1941, now Patent No. 2,379,785.

The outlet side of the meter is connected to the dispensing line 50 which is provided with the pipe 52 extending upwardly through the top 54 of the casing 30 and substantially on the vertical center line thereof. The pipe 52 is secured to the housing 56 which is secured as at 58 to the top 54 of the casing 30. The collar 60 is rotatably supported on the housing 56 and is secured as at 62 to the horizontally disposed plate 64, said plate having the annular portions 66 formed therein providing convenient anchorage for one end of the reel spring 68. The cover plate 70 is likewise secured to the plate 64 as at 72 and extends upwardly forming a housing terminating with the upturned flange 74. The plate 70 is provided with a hose outlet as at 76, and the hose outlet fitting 80 is secured thereto as at 82. The fitting 80 is provided on one side with the vertical roller 84 pivoted thereto as at 86 and is provided with the upper and lower horizontal rollers 88 and 90 pivoted thereto as at 92 and 94. The fitting at the side opposite to the roller 84 is provided with the outlet guide means 96 which conveniently may take the form of an obtuse angle. The hose reel proper may conveniently take the form of upper and lower plates 98 and 100 secured as at 102 and 104 to the outlet arm 106 and the hose arms 107 of the manifold 108, and the other end of the reel spring 68 is secured to said manifold as at 109. The manifold 108 is pivotally mounted as at 110 and 112 on the vertical pipe 114 which forms an extension of the pipe 52, and a suitable stuffing box or gland 116 is provided to insure a liquid seal adjacent the pivot 110.

The pipe 114 extends upwardly into the visigauge 118 which forms a closure for the manifold 108, being secured thereto with a liquid-tight seal as at 120, a suitable guard 122 being provided overlying the flange 74 of the casing 70. A movable member 124 may be provided in the visigauge, which member may conveniently be in the form of a float ball which moves upon movement of liquid through the visigauge. An opening is provided as at 126, forming a communication between the visigauge and the manifold 108, and the tube 128 may be provided extending from a high point in the visigauge downwardly through the opening 126 and into the outlet arm 106, whereby air will be exhausted from the visigauge by Venturi action. The outlet arm 106 communicates with the inner end 130 of the hose 132, the hose in retracted position being coiled around arms 106 and 107, and extending outwardly through the opening of the fitting 80. The outer end of the hose is provided with a nozzle 134 which, in inoperative position, may be conveniently disposed in the boot 136.

The nozzle guard may also be supported by the clip 138 provided on the casing 30, and when in inoperative position, the nozzle abuts the lever 140 pivoted to the casing as at 142, preventing outward movement of the lever. The lever 140, in its innermost position, contacts and maintains the plunger 144 in its innermost position. The plunger 144 contacts the arm 146 of the bell crank 148, said bell crank being pivoted as at 150 to the bracket 152 provided on the casing 30. Another arm 154 of said bell crank is pivoted to the plunger 156, which may be moved downwardly when the hose nozzle is removed from the boot to move the arm 158 upwardly, or in a clockwise direction. The arm 158 is pivoted to the link 160, which in turn is connected as at 162 to the operating arm of the motor switch 38. Thus, downward movement of the plunger 156 closes the switch 38, whereas inward movement of the plunger 144 opens the switch 38.

Assuming the nozzle to be in inoperative position, such as shown in Figures 2 and 3, and it is desired to dispense liquid, the nozzle is removed from the boot 136, and the rod 156 is then depressed, closing the switch 38, causing the motor 36 to operate the pump 34. Liquid will then be pumped from a source of supply to the meter 44, passing through the meter when the nozzle valve is opened, causing the meter shaft to operate the register. When it is desired to obtain a longer length of hose, the nozzle is pulled outwardly, winding up the spring 68. Due to the pivotal mounting of the horizontal hose reel, the reel may be moved bodily through at least 360°. Slacking of the hose will cause the spring to restore the hose to retracted position, as shown in Figure 3, at which time the nozzle may be replaced in the boot, inward movement of the plunger 144 opening the switch 38. It will be seen that liquid passing upwardly from the meter through the pipe 52 and the pipe 114, moves or agitates the float 124 as the liquid passes downwardly into the manifold 108, and through the outlet arm to the hose. Passage of the liquid will cause the air or vapor to be withdrawn from the top of the visigauge through the tube 128 as already explained.

In the construction shown in Figure 4, a form of liquid dispensing apparatus is shown wherein the meter directly drives the registering mechanism and the variating mechanism. In this form of device, the casing 270 houses the meter 272, the inlet side of which is supplied with liquid from a suitable pump as shown in Figure 1. The outlet side of the meter is connected through the pipe 274 to the pipe 282, through the fitting 277, said pipe extending upwardly and being similar to pipe 114 terminating adjacent the top of the visigauge 280. Visigauge 280 connects with manifold 276, similar to manifold 108, the manifold having a platform member 278 forming a bottom support for the visigauge, the top of the visigauge being closed as by the platform member 284. The supports 286 are disposed between said platform member 284 and the variating mechanism 288 for the register 290, the variating mechanism and register being substantially in the form shown in Patent No. 2,151,239, Slye et al., granted March 21, 1939, wherein the price of the liquid dispensed is shown at 292, and the amount of said liquid is shown at 294.

The setting of the variator for the prevailing price is shown at 296. The meter shaft 298 extends upwardly through an aperture 300 in the fitting 277 and through a tube 302 threaded into said fitting as at 304. The tube extends upwardly through the manifold 276 and through the tube 282, and through a stuffing box or gland 306 provided in the platform member 284, and is secured to the drive shaft 308 of the variator and register. The hose reel assembly 310 is rotatably mounted on the manifold in a manner already described, the hose extending outwardly through the fitting 312 (similar to fitting 80), the nozzle being adapted to be supported on the platform 314, the end of said nozzle being adapted to be received in the housing 316, or the boot construction with the switch controls of Figures 1 to 3 may be used. The operating lever 318 may be provided for controlling the motor switch through suitable connections (not shown) in place of the controls shown in Figures 1 to 3.

In the operation of this form of device, the nozzle is removed from the platform or boot 314, after which the switch lever 318 (or rod 156) may be operated to closed position. Liquid then passes through the meter to the manifold fitting 277 through the tube 282 to the sight gauge 280, and downwardly through the manifold 276 to the hose, where it may be dispensed in the usual way. As before, this hose reel assembly permits rotation through at least 360°, or more as desired by the operator.

In the device shown in Figure 5, the casing 320 is provided with the pedestal 322, and said casing houses the pump 324, the suction side 326 thereof being connected to a suitable source of supply (not shown). The pump is operated by the motor 327 which is controlled in a manner described in the modification illustrated in Figures 1, 2 and 3. The pump outlet is connected through the piping 328 to the inlet side of the meter 330. The outlet side of the meter is connected to the piping 332 which extends upwardly into the hose reel assembly 334, which is similar to that already described with respect to Figures 1, 2 and 3. The liquid passes through the visigauge 336 (similar to visigauge 118) and through the hose 338 to the hose nozzle 340, shown in supported position in the boot 342.

In this form of construction, the hose reel may be rotated through substantially 320°. The support 344 is disposed adjacent the casing and extends upwardly, being provided with the housing 346 for the register 348. The register 348 is similar to the register 290, being provided with the variator 350 similar to the variator 288, the window 352 showing the cost of each sale, the window 354 showing the amount of each sale, and the windows 356 showing the daily price. The meter shaft 358 is connected as at 360 to the shaft 362 suitably journaled as at 364 and 366. Said shaft 362 is connected as at 368 to the shaft 370 disposed in the support 344 and suitably journaled therein as at 372 and 374. Said shaft 370 is connected as at 376 to the shaft 378 journaled as at 380 and 382, and said shaft 378 is connected as at 384 to the drive shaft 386 of the variator and register. Of course, it is understood that the pump and meter may be disposed in the casing 320 in the support 344 in such a manner that the meter shaft is directly connected to the shaft 378.

Referring now to Figures 6 and 7, means is shown for substantially closing the opening through which the hose extends, and of course this means may be provided on any casing for the hose reel. In this construction the hose reel casing 388 is provided with the opening 390 which of course may be provided with the rollers disposed outwardly of the casing. A plurality of brackets 392 is disposed inwardly of the casing, and the plate 394 is movably or floatably mounted within said brackets 392. Said plate is provided with the opening 396 embracing the hose, and through which the hose passes. Thus, the hose may be moved around in the opening 390 as the plate 394 will follow the hose. Cleaning means thus is provided for the hose by said plate, and said plate prevents moisture, snow or dirt from entering the casing.

Referring now to the construction illustrated in Figures 8 to 14 inclusive, a form of device is shown wherein liquid is introduced through the top of the manifold. In this construction the fixed support 398 is adapted to be secured within the casing of a liquid dispensing apparatus and is secured to the housing 400, said housing being provided with the inlet conduit 402 secured as at 404 to the inlet pipe 406, the lower end of said conduit being closed by means of the plug 408 and the securing means 410. It is understood, of course, that a bottom connection may be provided by removing the plug and inserting an inlet tube within the conduit 402, in which case the visigauge may be attached at the top of the member 402, similar to those shown in Figures 1 to 5 inclusive. The conduit 402 is apertured as at 412 to permit liquid to flow into the housing member 414 provided with the outlet arm 418 to which the hose 420 is secured. The other end of the hose extends outwardly as at 422 over suitable guide rollers (as shown in Figures 2 and 16), the nozzle being adapted to be supported on suitable means such as previously described. Suitable seals 424 and 426 are disposed adjacent the conduit 402, and sealing means 428 and 430, urged apart by means of the spring 432, maintaining a fluid-tight joint within the housing 414. A housing or casing 434 is provided for said hose reel assembly, and includes a latch plate 436 rotatably mounted as at 438 on the housing 400. The latch plate 436 is provided with the latch member 440 pivoted thereto as at 442 and being provided with the spring 444 interposed between said latch and a bracket 446 provided on the plate 436, said spring urging said latch into latching position.

The plate 436 is slotted as at 448, extends outwardly of the latch pivot and is secured to the plate 450 of the casing 434. The upper part of the casing is closed by means of the suitably shaped plate 452 the flanged portion 453 of which may form a bearing with adjacent structure. A ring 454 is disposed within the member 436 and is adapted to be rotated relative thereto, said ring being provided with the spaced notches 456 adapted to be engaged by the latch 440. The reel retrieving spring 458 is mounted within the ring 454, one end of the spring being secured to said ring as at 460, the other end of said spring being secured to the pin 462 carried by the hub member 464. It will thus be seen that by moving the ring 454 to engage the latch 440 in the selected notches 456, the spring 458 may be tightened or loosened so that the hose 420 may be retrieved under different tensions. The hub member 464 is secured as at 466 to the housing member 414, said housing member 414 being fixedly provided with the bottom plate 468 for supporting the hose 420. The plate 468 is provided with the upper plate 470 fixed thereto as at 472 whereby a substantially annular channel shaped hose receiving portion is provided.

The plate 468 is provided with the supporting plate 474 fixedly secured thereto as at 476, said plate being provided with the elongated latch pivot or pin 478. The pivot 478 is provided with the shoulder 480 between the plate 474 and the bushing 486. The latch member 482 consists of the lower (substantially elliptical) locking member 484 provided on the bushing 486 pivotally mounted on the pin 478. The bushing is also provided with the lower and upper ratchets 488 and 490 (Figure 10) suitably spaced from each other and from member 484 by the spacing means 492 (Figure 8), being retained on said bushing by means of the retainer 494. The ratchets 488 and 490, as well as the locking member 484, the bushing 486 and the spacing means 492 are secured together as at 494.

The ratchet members, in the embodiment shown, are each provided with four equally spaced teeth 498 and 500, respectively, said teeth of the ratchets being disposed in staggered relation whereby they are disposed at an angle of 45° with respect to each other. Certain of the teeth 498 of the upper ratchet are in alignment with the pair of locking ends 502 of the locking member 484. The member or plate 450 is provided with the spaced annular locking segments 504 which are substantially channel shaped in section as viewed in Figure 8. The upstanding legs 506 of the member 504 are spaced a sufficient distance to clear the restricted portion of the member 484, but will engage the portions 502 of said member when in the dotted line position as shown in Figure 9, or the full line position as shown in Figure 10. The member 450 is provided with the annular support 508 secured thereto as at 510 to which the operating cam 512 is pivoted as at 514.

The cam 512 is provided with the spaced jaws 516 and 518 so disposed as to embrace the shoulder 480. The jaw 516 is longer than the jaw 518 and extends radially outwardly to a position where it can engage the teeth 500 of the lower ratchet member 488. The tooth engaging portion or shoulder 520 is deflected downwardly as shown in Figure 14 so that it will be disposed in the plane of the lower ratchet. The jaw 518 is provided with the follower portion or member 522 adapted to engage the shoulder 480. Between the jaws there is provided a downwardly deflected portion 524 extending to the plane of the upper ratchet 490, said deflected portion being disposed inwardly (in a radial direction) of the pivot 478 whereby it may engage the teeth 498 of the upper ratchet. When the hose is in fully retracted position, that is, where it is disposed in the recess formed by the lower and upper members 468 and 470, the member 484 will be in the position as indicated at 526 in Figure 10, and in that position the operating cam 512 will be in the dotted line position as shown in Figure 9.

Moving the hose outwardly rotates the reel in a clockwise direction as viewed in Figure 9, causing the shoulder 480 to move toward and engage the follower member 522 of the cam 512. In moving to engage the member 522, the deflected shoulder 524 will engage the tooth 498 of the upper ratchet 490, to rotate the locking member 484 from the position 526 as shown in Figure 10 to the position as shown at 528 in Figure 10, that is, through 45°. In this position, the upstanding shoulders or legs 506 of the adjacent segment 504 will pass the member 484. The shoulder 480 is in engagement with the member 522 and will move the cam 512 until it is desired to latch the hose, or until the operator has withdrawn the desired amount of hose.

Slight release or return of the hose on the reel by the retracting spring 458 will cause the shoulder 480 to move toward the jaw 516, whereupon the shoulder 520 will engage one of the teeth 500 of the lower ratchet 488, moving the member 484 from the position at 528, to the full line position as shown in Figure 10, or full locked position. The spring 458 then tends to return or retrieve the hose and will cause the spaced members 506 to engage the oppositely extending locking ends 502 of the member 484 to retain the hose in locked out position. When it is desired to release the latch the hose is pulled out slightly, causing the shoulder 480 to move toward the follower 522, whereupon the deflected portion 524 will engage one of the teeth 498 of the upper ratchet to move the member 484 to released position such as shown at 530 in Figure 10. This will move the locking ends 502 out of the path of the upstanding legs 506 of the member 504 to permit rotation of the reel to retrieve the hose in a counterclockwise direction. Counterclockwise movement of the reel will cause the shoulder 480 to move toward the jaw 516, causing the member 520 to engage the teeth 500 of the lower ratchet 488 to move the member 484 to fully returned position as shown at 526 in Figure 10. The parts are then in position where the cycle may again be repeated.

Referring now to the modification illustrated in Figures 15 to 19 inclusive, the liquid dispensing apparatus is shown utilizing a horizontal type hose reel so disposed that the hose may be withdrawn through an angle of substantially 320° instead of the usual 180° without contacting a portion of the stationary housing of the apparatus. Also, with this reel a much longer hose may be supplied, as it is readily stored and need not be laid on the ground, as in the case of extra lengths of hose with the ordinary pump. In utilizing an extra length of hose with an ordinary pump there is, of course, the danger that the looped portion of the hose will be left lying on the ground where it may be damaged, causing a fire hazard, or may be a dangerous obstruction. With this type of pump, therefore, with the added length of hose permissible, service may be readily given through an arc of 360° without any inconvenience, danger or chance of damage to the apparatus.

The apparatus includes a casing 600 provided on the base 602, the lower portion of the base inclosing the pump 604, said pump being actuated by means of the motor 606. The suction side of the pump is connected to the storage tank (not shown) by means of the suction stub 608. The outlet side of the pump is connected through the pipe 610 to the inlet side of the meter 612, the meter being supported on the base 602 through bracing 614, while the motor and pump are supported on the bracing 616 connected to the upright bracing 618. The outlet side of the meter is connected to the pipe 620 which extends upwardly in the extended closed portion of the apparatus housing and is connected to the housing 622 of the visigauge 624. The housing 622 is connected through the pipe 626 to the housing 628 of the visigauge 630, and the housing 628 is connected to the pipe 632 which extends downwardly and is connected to the inlet fitting or casting 634 of the hose reel 636.

The meter is provided with the meter shaft 638 extending upwardly in the closed portion of the apparatus housing and is connected to the coupling 640, said coupling being provided with a shaft (not shown) extending into the gear box 642 of the variator 644. The variator is supported on the bracing 646 and is operatively connected to the indicating mechanism 648. The upper portion of the apparatus housing extending to the reel casing terminates as at 650 adjacent the top of the hose reel casing, but a portion of the hose reel casing is enclosed by the continuous portion of the apparatus casing as indicated by the dotted line 652, the continuous portion being at the left of Figure 15.

The indicating mechanism 648 is provided with the reset shaft 654 having the reset crank 656, and is provided with the usual interlock 658. The interlock is operatively connected in a well known manner, though not illustrated herein, to the rod 660, said rod being pivoted as at 672 to the bell crank 674. The bell crank is pivoted as at 676 to the support 678 and the other arm of the bell crank is pivoted as at 680 to the rod 682, said rod being pivoted as at 684 to the switch arm 686 of the control switch 688 for the motor 606. The last named arm of the bell crank 674 is also pivoted as at 680 to the rod 690 pivoted as at 692 to the lever 694. The lever 694 is pivoted as at 696 adjacent the top of the hose boot 698, said boot being for the reception and support of the hose nozzle 700 when in inoperative position. A suitable support indicated generally at 702 is provided for supporting the nozzle in inoperative position. When the hose is in the boot the lever 694 cannot be moved to operative position, but is maintained in inoperative position. However, when the nozzle is removed, the lever 694 can be moved in a counterclockwise direction to operate the motor switch 688, provided that the interlock 658 has been conditioned for this movement by resetting the indicator 648 to zero by rotation of the crank 656. The boot 698 is provided with an opening 704 adjacent the bottom thereof to prevent the collection of any drippage, should any occur. The air separator of the pump 604 is connected to the pipe 706, which is carried upwardly and vented at an opening 708 adjacent the top of the apparatus housing.

The hose reel 636 is provided with the supporting member 710 secured to the bracing 712. The member 710 supports the conduit member 714 secured thereto as at 716, the upper portion of the conduit member being secured as at 718 to the inlet fitting 634. The inlet fitting communicates with the conduit member 714, and said member is provided with the openings 720 extending radially and communicating with the manifold 722. The manifold 722 is rotatably mounted with respect to the conduit member 714 through the anti-friction means or bearings 724, and is secured as at 726 to the member 728 which is rotatably mounted with respect to the conduit member through the anti-friction means or bearings 730. The manifold 722 is provided with upper and lower spaced plates 732 and 734 secured thereto as at 733 and 735, and said plates are suitably braced and connected as at 736. The inner end of the hose 738 is connected to the manifold as described with respect to Figure 3, and the outer end of said hose passes over the rollers 740, 742 and 744 pivoted to the reel housing and passes outwardly through an aperture 746 provided in the housing 748 and is connected to the nozzle 700.

Anchoring means 750 is also secured at 726 to the manifold 722 and the inner end 752 of the retraction spring 754 is anchored thereto, the outer end 756 of said spring being anchored to the member 758 similar to the ring member 454. The member 758 is rotatable to proper tensioning position and latched in that position by the tensioning device 760 similar to the tensioning device 440, 442 and 444 illustrated in Figure 11, it being understood that the member 758 has notches similar to the notches 456 whereby it may be positioned by said latch device in the manner already described with respect to Figure 11. The member 758 is mounted on the supporting plate member 762 which is rotatably mounted as at 764 on the member 710, a track being formed on the member 710, the plate being retained by the ring 766 secured as at 768 to the member 710. The plate 762 extends upwardly adjacent the outer end thereof and is flanged as at 770 and is secured as at 782 to the outer housing member 784. The housing member 784 extends upwardly around the plates 734 and 732, being upwardly flanged as at 786 closely adjacent the inlet fitting 634 and may form a bearing fit therewith. Said housing member 784 is suitably braced as at 788 and supports the housing 748.

In order to retain the grease for the anti-friction bearings 730, a felt washer 790 may be disposed between the member 710 and the member 750. Carbon seal rings 792 and 794 are mounted on the conduit member 714 and have a bearing on the member 728 and on the upper member 796 carried by the manifold 722. These carbon members 792 and 794 are identical, one of which is illustrated in Figure 19. Each of said members has oppositely disposed lugs 798 which interfit with slots 800 provided in the metal seal rings 802 and 804, said rings being identical. The rings are cup shaped and serve as retainers for the rubber packing 806 and 808. An expansion spring 810 is disposed between the outwardly extending flanges 812 and 814 of the seal rings, forcing them apart and preventing escape or distortion of the rubber so that the rubber cannot be squeezed out. The rings are provided with upwardly extending flanges 816 and 818 which are notched as at 820 for the reception of the securing member 822 fixed to the conduit 714. The housing member 784 is also provided with the plate 824 secured thereto as at 782, said plate being provided with the track member 826 on which the operating cam 828, similar to the cam 512, is mounted. The cam is identically shaped to cam 512, being rotatably mounted in the track member 826, and has cooperative relation with the latch member 830 similar to the latch member illustrated in Figure 10, and serving the same purpose. The latch member is pivoted as at 832 to the plate 734 and is braced thereto as at 834.

As the operation is identical to that already described with respect to Figures 8 to 14 inclusive, no further description of the operation is necessary.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is:

1. In liquid dispensing apparatus, the combination of a casing, a liquid flow line in said casing, a substantially horizontal hose reel mounted on said casing, said hose reel having a retractable hose adapted to be selectively coiled thereon or withdrawn therefrom, means connecting said hose and flow line, a meter in said flow line having a meter shaft driven in accordance with liquid passing through said meter, registering means adapted to be driven by said meter shaft, a support for the registering means adjacent one side of said casing so disposed that the hose is adapted to be withdrawn from said reel at any position at an arc of substantially 320°, and connecting means in said support operatively connecting said registering means and meter shaft.

2. In combination, a hose reel assembly including a support, a conduit member non-rotatably mounted on said support and having an inlet, a manifold rotatably mounted with respect to said support and conduit member, leak preventing means between said manifold and conduit, said leak preventing means comprising upper and lower members non-rotatably mounted with respect to said manifold, a seal ring engaging each of said upper and lower members, cup shaped seal rings disposed adjacent each of said first named seal rings, packing between said upper and lower seal rings and the adjacent cup shaped rings, resilient means between said cup shaped seal rings, and means on said conduit member for non-rotatably securing said cup shaped seal rings to said conduit member.

3. In a liquid dispensing apparatus, the combination of a casing, a liquid flow line in said casing, a hose reel mounted to rotate around a substantially vertical axis with respect to said casing, said hose reel having a retractable hose adapted to be selectively coiled thereon or withdrawn therefrom, means for pivotally mounting said hose reel with respect to said casing and for connecting said hose and flow line, a meter in said flow line having a meter shaft driven in accordance with liquid passing through said meter, and a register for showing the amount of liquid passing through said meter, said casing having an upwardly extending portion partially embracing said reel and supporting said register, said meter shaft extending upwardly in said casing portion beyond the periphery of said reel and being operatively connected to said register, said hose being adapted to be withdrawn radially in a plurality of directions with respect to said upwardly extending portion of said casing.

4. In liquid dispensing apparatus, the combination of a casing, a liquid flow line in said casing, a horizontal hose reel mounted to rotate around a substantially vertical axis with respect to said casing, said hose reel having a retractable hose adapted to be selectively coiled thereon or withdrawn therefrom, a housing for said hose reel having an opening through which the hose may be withdrawn, means for pivotally mounting said hose reel with respect to said housing and for connecting said hose and flow line, said housing being pivoted with respect to said casing and reel, a meter in said flow line ahead of said reel and having a meter shaft driven in accordance with liquid passing through said meter, a visigauge disposed in said flow line between said meter and reel for visibly showing the liquid flow through said flow line, said meter shaft being adapted to control registering means for indicating flow through said meter, rotation of said housing permitting said hose to be selectively withdrawn in a plurality of radial directions so that liquid may be dispensed regardless of the position of a receiver of liquid with respect to the registering means.

5. In liquid dispensing apparatus, the combination of a casing, a liquid flow line in said casing, a horizontal hose reel mounted to rotate around a substantially vertical axis with respect to said casing, said hose reel having a retractable hose adapted to be selectively coiled thereon or withdrawn therefrom, a housing for said hose reel having an opening through which the hose may be withdrawn, means for pivotally mounting said hose reel with respect to said housing and for connecting said hose and flow line, said housing being pivoted with respect to said casing and reel, means for releasably holding said reel in selected positions in relation to said housing, a meter in said flow line ahead of said reel and having a meter shaft driven in accordance with liquid passing through said meter, a visigauge disposed in said flow line between said meter and reel for visibly showing the liquid flow through said flow line, said meter shaft being adapted to control registering means for indicating flow through said meter, rotation of said housing permitting said hose to be selectively withdrawn in a plurality of radial directions so that liquid may be dispensed regardless of the position of a receiver of liquid with respect to the registering means.

6. In combination, a hose reel assembly including a support, a conduit member non-rotatably mounted on said support and having an inlet, a manifold rotatably mounted with respect to said support and conduit member, reel members rotatable with said manifold, a hose receivable between said reel members and having one end connected to said manifold, leak preventing means between said manifold and conduit, said leak preventing means comprising upper and lower members non-rotatably mounted with respect to said manifold, a seal ring engaging each of said upper and lower members, seal members disposed adjacent each of said seal rings, and resilient means between said seal members urging them toward said seal rings.

7. In liquid dispensing apparatus, the combination of a casing, a liquid flow line in said casing, a horizontal hose reel mounted to rotate around a substantially vertical axis with respect to said casing, said hose reel having a retractable hose adapted to be selectively coiled thereon or withdrawn therefrom, a housing for said hose reel having an opening through which the hose may be withdrawn, means for pivotally mounting said hose reel with respect to said housing and for connecting said hose and flow line, said housing being pivoted with respect to said casing and reel, a meter in said flow line ahead of said reel and having a meter shaft driven in accordance with liquid passing through said meter, a visigauge disposed in said flow line between said meter and reel for visibly showing the liquid flow through said flow line, said visigauge being disposed above said reel, said means extending into and opening into said visigauge whereby the liquid flows from the flow line into the visigauge prior to flowing to said hose, said meter shaft being adapted to control registering means for indicating flow through said meter, rotation of said housing permitting said hose to be selectively withdrawn in a plurality of radial directions so that liquid may be dispensed regardless of the position of a receiver of liquid with respect to the registering means.

8. In liquid dispensing apparatus, the combination of a casing, a liquid flow line in said casing, a horizontal hose reel mounted to rotate around a substantially vertical axis with respect to said casing, said hose reel having a retractable hose adapted to be selectively coiled thereon or withdrawn therefrom, a housing for said hose reel having an opening through which the hose may be withdrawn, means for pivotally mounting said hose reel with respect to said housing and for connecting said hose and flow line, said housing being pivoted with respect to said casing and reel, a meter in said flow line ahead of said reel and having a meter shaft driven in accordance with liquid passing through said meter, a visigauge disposed in said flow line between said meter and reel for visibly showing the liquid flow through said flow line, said visigauge being disposed above said reel, said means extending into and opening into said visigauge whereby the liquid flows from the flow line into the visigauge prior to flowing to said hose, means extending from adjacent the top of the visigauge toward the hose for removing vapor from the top of said visigauge, said meter shaft being adapted to control registering means for indicating flow through said meter, rotation of said housing permitting said hose to be selectively withdrawn in a plurality of radial directions so that liquid may be dispensed regardless of the position of a receiver of liquid with respect to the registering means.

ROBERT J. JAUCH.
SHERWOOD HINDS.
FREDERICK W. STURM.